United States Patent [19]

Ono et al.

[11] 3,752,045

[45] Aug. 14, 1973

[54] ELECTRONIC TIMER CONTROL FOR A SHUTTER

[75] Inventors: Shigeo Ono, Yokohama-shi, Kanagawa-ken; Ichiro Hamaguchi, Shinagawa-ku, Tokyo, both of Japan

[73] Assignee: Nippon Kogaku K. K., Tokyo, Japan

[22] Filed: Sept. 2, 1970

[21] Appl. No.: 69,164

Related U.S. Application Data

[63] Continuation of Ser. No. 695,199, Jan. 2, 1968, abandoned.

[52] U.S. Cl. .................................... 95/10 CT

[51] Int. Cl. .................................... G03b 7/08

[58] Field of Search .................... 95/10 CE, 10 CD, 95/10 CT; 356/223

[56] References Cited

UNITED STATES PATENTS 3,693,518 9/1972 Yamada et al. .................... 95/10

3,324,779 6/1967 Nobusawa .................... 95/10

3,466,447 9/1969 Fahlenberg .................... 356/223 X 3,533,348 10/1970 Yanagi .................... 95/10 X 3,393,604 7/1968 Lundin .................... 95/10 X

OTHER PUBLICATIONS

General Electric Transistor Manual, 7th Edition, 1964, pp. 115 to 116.

*Assistant Examiner*—Michael L. Gellner

*Attorney*—Anton J. Wille

[57] ABSTRACT

An exposure control arrangement for a camera having an objective lens and a shutter moveable between closed and open positions is disclosed. A light intensity to voltage conversion means is positioned behind the objective lens for converting essentially each value of the intensity of the light passing therethrough during use of the camera to a first voltage having a value essentially linearly proportional to a logarithm of the value of this intensity. The first voltage is selectively stored in a capacitor memory means and switching means are provided for coupling the capacitor memory means to the conversion means during intervals when light passing through the objective lens is incident on the conversion means and for disconnecting the capacitor memory means from the conversion means when light passing through the objective lens is not incident on the conversion means. A timing circuit is coupled to the capacitor memory means. The timing circuit includes a voltage to current conversion means which converts the value of the voltage stored in the capacitor memory means to a current having a value proportional to an antilogarithm of the stored voltage, and also includes a timing capacitor charged by said current. A shutter actuating circuit is operatively coupled to the timing circuit and returns the shutter to said closed position when the timing capacitor is charged to a predetermined voltage.

16 Claims, 11 Drawing Figures

ELECTRONIC TIMER CONTROL FOR A SHUTTER

This application is a continuation of copending application Ser. No. 695,199, filed Jan. 2, 1968, now abandoned.

This invention relates to an electronic timing circuit for controlling the operation of a shutter mechanism.

In controlling the operation of a shutter mechanism, it is known to use an RC timing circuit in which a capacitor is charged to a predetermined voltage through a resistor. The operation of the shutter is timed in accordance with the time necessary for the capacitor to achieve the predetermined voltage, i.e., opening when charging is initiated, closing when the predetermined voltage is attained. As is well known, this time period is determined by the product (R C) of the resistance and the capacitance of the circuit, called the "time constant" of the circuit. Hence, the circuit may be considered a time delay circuit.

As is also well known, the RC charging curve is non-linear, i.e., the slope of the tangent to the curve varies depending upon at what point the tangent touches the curve. The curve is such that the slope of the tangent at any point is less than the slope of a line connecting the starting point and that particular point. This means that as time goes on, the change in voltage per change in time progressively decreases, making the circuit less and less sensitive as compared with the uniform sensitivity obtained with a linear charging curve.

When the resistance R in the RC circuit is a photoconductor, exposure may be controlled automatically. Generally if B denotes the brightness of the subject, and $K_1$ and $\gamma$ are constants peculier to the photoconductive material, then $$R = K_1 \cdot B^{-\gamma} \quad (1)$$

Taking the equation for the discharge of a capacitor, $$V = V_o (1 - e^{-t/RC}) \quad (2)$$

and substituting for R according to equation (1) one obtains:

$$V = V_o (1 - e^{-tB^{\gamma}/k_1C}. \quad (3)$$

The exposure time $t$ in the camera is determined as follows:

$$t = k_2 \cdot A^2/SB \quad (4)$$

where $k_2$ is a constant of proportionality, S is film sensitivity, and A is the $f$-stop setting of the lens. Thus, if A and S are determined, equation (4) reduces to:

$$Bt = \text{a constant} \quad (5)$$

It can be seen that for equations (3) and (5) to have a simultaneous solution, $\gamma$ must equal unity. However, for a typical photoconductor material, e.g., cadmium sulphide (CdS), the value of $\gamma$ is less than unity. Further, typical photoconductors have non-uniformaties in their resistance vs. brightness characteristic.

In the modern cameras of the single lens reflex type, the light measured by the exposure meter is that coming through the lens of the camera. The exposure meter cannot function, however, just prior to the operation of the shutter since the mirror, which generally reflects the light to the exposure meter, must be removed from the lens-film path so that the film can be exposed. This requires that the exposure determined by the meter be memorized in some way so that a proper exposure is made when a shutter is actuated.

In addition to these technical difficulties besetting one attempting to produce an accurate exposure measuring instrument, when one attempts automatic exposure control, the film sensitivity and $f$-stop setting of the lens must also be taken into consideration. Further, photographers using the automatic exposure control want to know, in advance of taking the picture, what the automatically determined exposure time is.

In view of the foregoing, it is therefore an object of the present invention to provide an automatic exposure control circuit in which the exposure time is determined by a time delay circuit whose time vs. voltage characteristic is linear.

It is another object of the present invention to provide an exposure measurement circuit in which the exponential response of the photoconductor is converted into an approximately linear response.

It is a further object of the present invention to provide an exposure measuring circuit in which non-uniformities in the response of the photoconductor are compensated.

Another object of the present invention is to provide an exposure measuring circuit in which the factor $\gamma$ from the equation $$R = k_1 \cdot B^{-\gamma}$$

may be readily compensated.

A further object of the present invention is to provide an exposure measuring circuit capable of compensating for variations in lens aperture and film sensitivity.

Another object of the present invention is to provide an automatic exposure control circuit that gives the photographer exposure information in advance of his taking the picture.

A further object of the present invention is to provide an automatic exposure control circuit in which the exposure is determined from a memorized voltage, the memorized voltage being proportional to a logarithm of the brightness of the subject.

The various features of the present invention may be best understood by considering the following detailed description in conjunction with the accompanying drawings in which.

Figure 3:
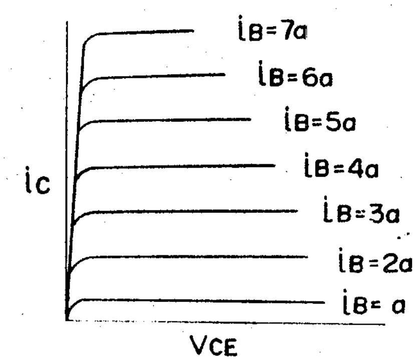
Figure 4:
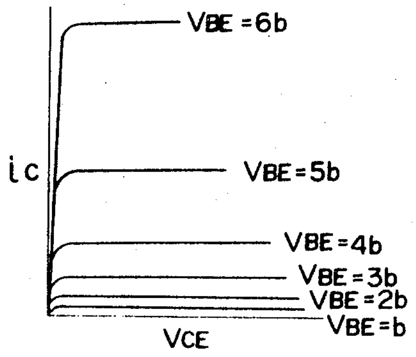
Figure 5:
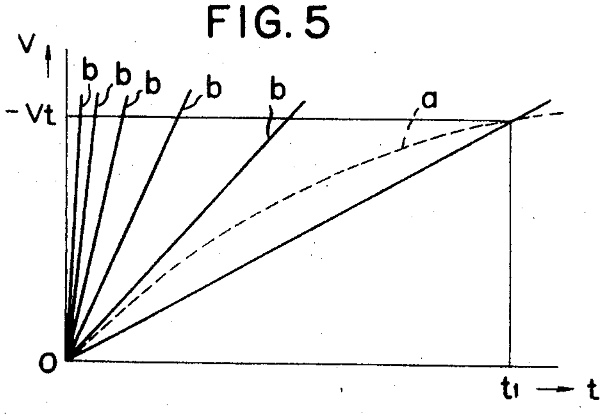

FIGS. 3, 4, and 5 illustrate graphs useful in understanding the present invention.

Figure 6:
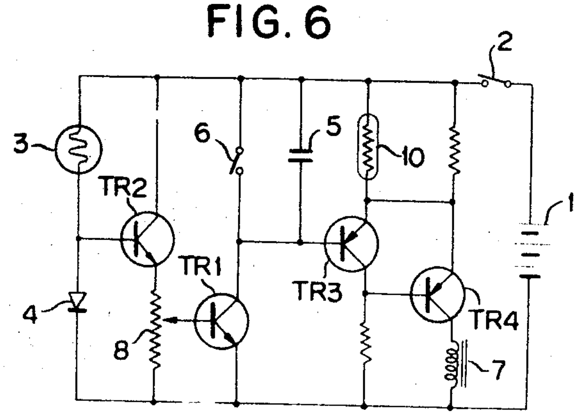
Figure 8:
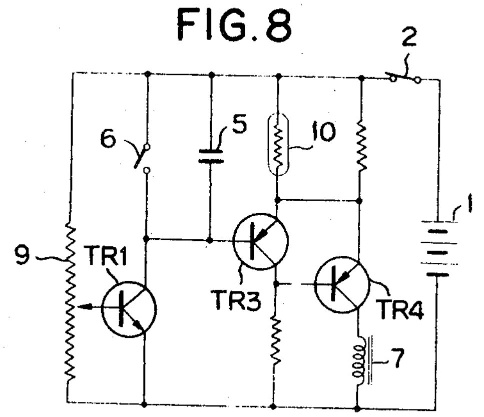

FIGS. 6, and 8 illustrate other embodiments of the present invention.

Figure 7:
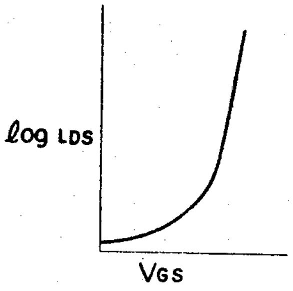

FIG. 7 illustrates a characteristic curve of a typical field effect transistor.

Figure 9:
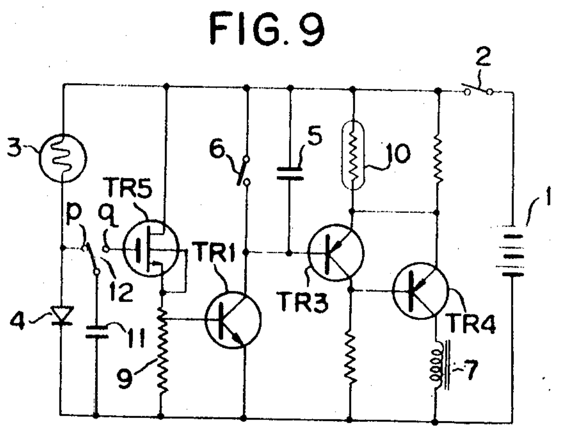

FIG. 9 illustrates another embodiment of the present invention, and in particular, a circuit for memorizing the exposure.

Figure 10:
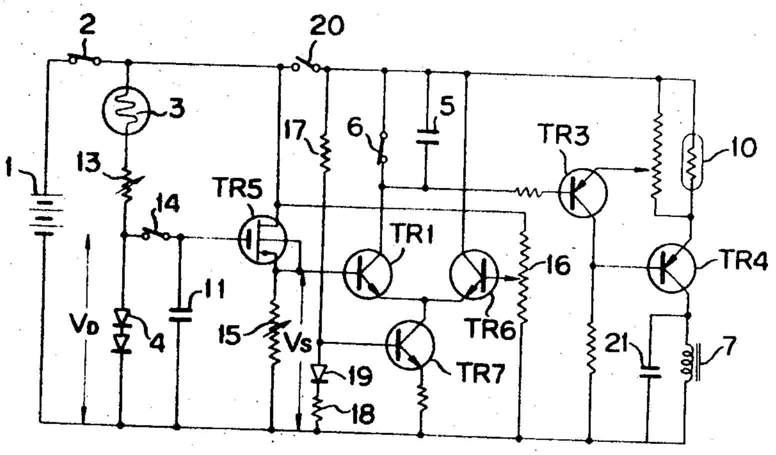

FIG. 10 illustrates a more complete circuit diagram of the features of the present invention.

Figure 11:
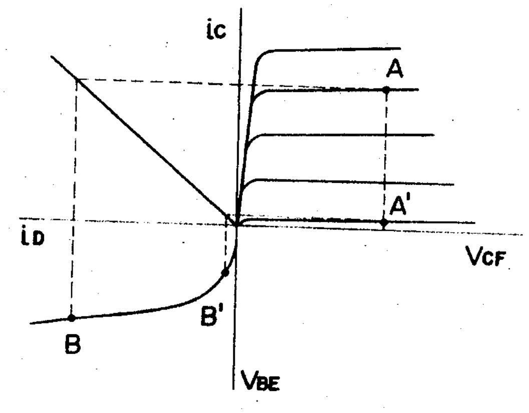

FIG. 11 illustrates a family of curves for typical transistors in FIG. 10.

Figure 1:
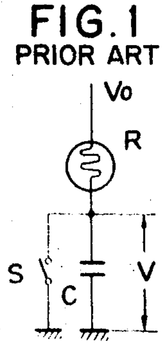
FIG. 1 PRIOR ART
FIG. 1 shows a shutter timer or delay control circuit of the prior art.

Referring to FIG. 1 there is shown a typical automatic shutter control circuit as has been utilized in the prior art. In this circuit photoconductor R is series connected with capacitor C between a source of potential $V_o$ and ground. Connected in parallel with capacitor C is switch SW. In this circuit the variation of the resistance of photoconductor R changes the time constant RC of the circuitry thereby variably delaying the closure of the shutter mechanism. When the operation of the shutter is initiated, that is, the shutter is opened, switch SW is also opened, enabling capacitor C to charge through photoconductor R. Upon the attainment of a predetermined voltage V across capacitor C the closing of the shutter mechanism takes place. A circuit such as that illustrated in FIG. 1 suffers from all of the deficiencies previously noted in connection with the prior art shutter control mechanisms.

Figure 2:
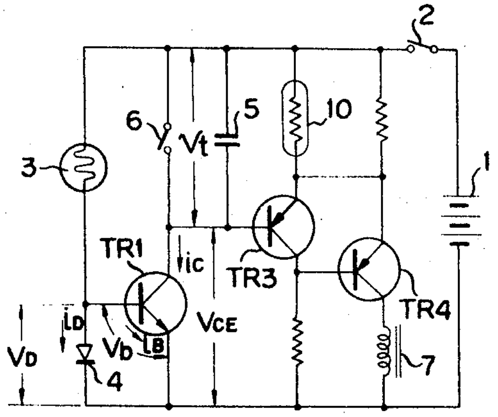
FIG. 2 illustrates a preferred embodiment of the present invention.

In FIG. 2 there is illustrated a preferred embodiment of the present invention which may be considered as generally comprising three states: a brightness-to-voltage conversion stage, a voltage to time transformation stage, and a shutter drive stage.

Specifically, in FIG. 2 the automatic exposure control circuitry is coupled to a voltage source 1 by on-off switch 2. The automatic exposure control circuitry comprises a photo-conductor 3 having series connected therewith diode 4. Coupled to the junction of photoconductor 3 and diode 4 is the base of transistor TR1. Transistor TR1 has its emitter connected to one side of voltage source 1 and its collector connected to the other side of voltage source 1 by way of capacitor 5. Capacitor 5 is shunted by switch 6 which is interconnected with the shutter mechanism of the camera in such a manner that when the shutter is operated switch 6 is opened to enable the charging of capacitor 5 to begin. Connected to the junction of capacitor 5 and transistor TR1 is the base of transistor TR3 which, with transistor TR4, form a switch transistor pair that serves to drive the closing mechanism of the shutter. This is accomplished by means of solenoid 7 which is connected to the collector of transistor TR4. Connected to the emitter of transistor TR3 is a thermister 10 which serves a compensating function which will be more fully described hereinafter.

The operation of the circuit of FIG. 2 is as follows: with switch 2 closed enabling voltage source 1 to supply an operating potential to the exposure meter, photoconductor 3 is exposed to the light coming from the object to be photographed. The variation of the resistance of photoconductor 3 varies the current through the series connection of photoconductor 3 and diode 4. Diode 4 converts the exponential or geometric variations in current from photoconductor 3 into a linear variation of voltage. Stated another way, the diode 4 functions to convert the light intensity incident on the photoconductor 3 to a voltage having a value essentially linearly proportional to a logarithm of the value of such intensity. This voltage is then coupled to the base electrods of transistor TR1 to adjust the current therethrough. All during this time, switch 6 is initially closed. Upon the activation of the shutter mechanism, opening it, switch 6 is also opened enabling current to flow through capacitor 5 and transistor TR1 which are connected in a series circuit across voltage source 1. The base emitter junction of transistor TR1 acts a diode in a manner similar to diode 4 to linearize the current variations through capacitor 5. The result is that transistor TR1 acts as a constant current source for capacitor 5 and produces a linear or arithmetical relationship between the voltage drop across capacitor 5 and time. Stated another way, the transistor TR1 functions to convert the value of the input voltage at its base to a current having a value proportional to an antilogarithm of the value of the input voltage. The voltage appearing at the junction of capacitor 5 and transistor TR1 is coupled to the base of transistor TR3 which compares the voltage drop across capacitor 5 with the voltage at its emitter. Upon the attainment of a predetermined voltage $V_t$ transistor TR3 is turned "on," which in turn biases transistor TR4 into an "off" state. The cessation of current flow through transistor TR4 causes a deactivation of solenoid 7 which enables the closing of the shutter mechanism and terminates the exposure.

Thus, by virtue of the actions of diode 4, transistor TR1, and capacitor 5, the variation in brightness is converted in a linear manner into a time delay which separates the opening and closing of the shutter mechanism. By virtue of the linearity of the capacitor charging curve of the circuit, the closing of the shutter mechanism may be more precisely controlled.

In FIG. 3 there is illustrated a family of curves in which the relationship between collector current $i_C$ and collector voltage $V_{CE}$ is plotted for a set of values of the base current $i_B$.

FIG. 4 illustrates another family of characteristic curves indicating the relationship between the collector current and the collector-to-emitter voltage for a set of values of the base emitter voltage $V_{BE}$. The family of curves illustrated in both FIGS. 3 and 4 may be considered typical of a transistor to be used as transistor TR1.

A mathematical analysis of the operation of the circuitry of FIG. 2 is as follows:

From equation (1), one knows that $R = K_1 B^{-\gamma}$ . However, the relation between the current $i_D$ through diode 4 and the voltage drop across diode 4 is given by:

$$V_D = k_3 \log i_D + V_{DO} \quad (6)$$

where $V_{DO}$ is a constant and the "$k$" term is a particular constant of proportionality. Taking the voltage of source 1 as $V_O$ and adding the voltage drops across elements 3 and 4, one obtains:

$$V_O = i_D R + k_3 \log i_D + V_{DO} \quad (7)$$

The solution to equation (7) in terms of brightness B is not easily obtained directly. An approximate solution obtained by substituting values for the various parameters yields the following $$V_D = k_4 \log B + V'_{DO} \quad (8)$$

where $V'_{DO}$ is another constant. Thus, as shown by equation (8), the geometric or exponential change in brightness is converted into an arithmatical or linear variation in voltage.

The base-emitter junction of transistor TR1 also acts as a diode. Thus, the relationship between the base-emitter voltage $V_{BE}$ base current $i_B$ and collector current $i_C$ is as follows:

$$V_{BE} = k_5 \log i_B \quad (9)$$

from which it follows that $$\log i_C = (V_{BE}/k_5) + \log \beta \quad (10)$$

where $\beta$ is the current amplification factor of the transistor. Equation (10) is derived from equation (9) as follows:

$$V_{BE}/k_5 = \log i_B$$

$$\text{now, } i_B = i_c/\beta$$

$$\text{thus, } V_{BE}/k_5 = \log i_C/\beta = \log i_C - \log \beta$$

$$\text{therefore: } \log i_C = V_{BE}/k_5 + \log \beta.$$

As can be seen from equation (10), the transistor converts linear or arithmatic variations at its input voltage into exponential or geometric variations at its output current, the collector current. Since $V_D$ is the same as $V_{BE}$ transistor TR1 perform an inverse log transformation. The operating point of transistor TR1 is then chosen so that the collector current $i_C$ is virtually unaffected by changes in the collector voltage $V_{CE}$ i.e., transistor TR1 is operated as a constant current source.

When the capacitor 5 is inserted in the collector circuit, the following describes the charging action of the capacitor:

0010/003/NCD where $V_t$ is the voltage drop across capacitor 5, C is the capacitance of the capacitor, and $t$ is time. Equation (11) may be re-arranged to produce:

$$t = CV_t/i_C \quad (12)$$

Since $i_C$ is now a constant, the capacitor charging curve of the circuit is now linear. The family of curves designated "*b*" of FIG. 5 represents different values of brightness. Compare curve "*a*" which represents a conventional capacitor charging curve. This linear relationship enables exposure time to be more accurately controlled.

Equations (8) and (9) can be manipulated to produce $$\log i_C = [(k_4/k_5)]^{(\log B + A)} \quad (13)$$

as follows:

$$V_D = V_{BE}$$

dividing equation (8) by equation (9) yields $$1 = k_4 \log B + V'_{DO}/k_5 \log i_B$$

$$\log i_B = k_4/k_5 \log B + V'_{DO}\,[(1/k_5)]$$

$$i_B = i_C/\beta$$

$$\log i_C - \log \beta = [(k_4/k_5)]\log B + V'_{DO}\,[(1/k_5)]$$

$$\log i_C = [(k_4/K_5)]\log B + [(V'_{DO}/k_5) + \log \beta]$$

$$\text{let } [(V'_{DO}/k_5) + \log \beta] = A$$

$$\text{then } \log i_C\ [(k_4/k_5)]\log B + A$$

Equation (13) may also be written:

$$i_c = A'B\ (k_4/K_5). \quad (14)$$

Since A is a constant, the following condition must be fulfilled in order to satisfy the relationship set forth in equation (4).

$$k_4/k_5 = 1 \quad (16)$$

It will be recalled that $k_4$ is the constant of proportionality associated with diode 4 and that $k_5$ is the constant of porportionality associated with the base emitter diode transistor TR1. When these constants of proportionality are equal, this is equivalent to the value of $\gamma$ of photocell 3 being transformed into 1.

There are two ways of satisfying equation (16). A first way is to carefully select the properties of diode 4 and transistor TR1. In this way, the specific properties of diode 4 and transistor TR1 can be matched. According to the second method, a voltage follower stage is added to the exposure meter circuitry, to couple the output from diode 4 to the base of transistor TR1. This arrangement is shown in detail in FIG. 6.

The arrangement of the elements of FIG. 6 and their reference numerals is identical to that of FIG. 2 with the exception of the addition of transistor TR2 and potentiometer 8. These last two elements are series connected across voltage source 1 and provide a coupling between the output voltage of diode 4 and the base of transistor TR1. The emitter-follower stage comprising transistor TR2 and potentiometer 8 provide a simple means for effectively dividing the constant $k_4$ by whatever necessary factor in order to fulfill equation (16). While two fixed resistances could be used in place of potentiometer 8, the use of a potentiometer is more convenient. With the addition of an emitter-follower stage, it is possible to transform $\gamma$ of photoconductor 3 to the value of 1, regardless of the actual value of the element constant. When $k_4$ is smaller than $k_5$, a plurality of diodes may be series connected or an amplifying stage may be added having a voltage gain greater than unity.

Field effect transistors can be used as the inverse transformation transistor TR1. FIG. 7 illustrates a graph of the logarithm of the drain current vs. gate voltage characteristic of a typical field effect transistor. It will be noted from FIG. 7 that there is a straight line or linear relationship over a portion of the operating range of the logarithm of the gate current $i_{DS}$ vs. gate voltage $V_{GS}$ characteristic. By virtue of this straight line or linear relationship, it is therefore possible to utilize a field effect transistor as the inverse logarithmic transformation stage in a circuit similar to that of FIG. 2. When this substitution is made, the drain current $i_{DS}$ is not affected by variations in the drain-source voltage $V_{DS}$ 24 in other words, the field effect transistor will also act as a constant current source for the charging of capacitor 5.

FIG. 8 illustrates another embodiment of the present invention in which the exposure time is manually controlled. In FIG. 8 the photocell and diode and voltage-follower circuitry have been replaced by potentiometer 9. The remaining circuitry of FIG. 8 is similar to that of FIG. 2. In operation the apparatus of FIG. 8 simply substitutes the manual adjustment of the operator for the automatic adjustment derived from the photocell and diode circuit. The exposure time is adjusted by moving the tap of potentiometer 9 between ground potential and the full potential of voltage source 1. This then varies the current gain of transistor TR1 and changes the rate at which capacitor 5 is linearly charged, thus changing the exposure time.

FIG. 9 illustrates another embodiment of the present invention in which a memory circuit has been added between diode transformation network 4 and a field effect transistor source follower stage. Specifically, a memory circuit comprises capacitor 11 coupled by a double pole, single throw switch 12 to either one terminal of diode 4 or the gate of the field effect transistor source-follower TR5. During operation the voltage drop across diode 4 is memorized by coupling capacitor 11 through switch 12 to terminal *p*. After this voltage is memorized, switch 12 is then changed to the *q* position which couples capacitor 11 to the gate of transistor TR5. Transistor TR5 then functions as a source follower and couples this voltage to potentiometer 9 which in turn applies a portion of the applied voltage to inverse transformation transistor TR1. The remainder of the circuitry of FIG. 9 functions in a manner similar to that in FIG. 2.

The memory circuit illustrated in FIG. 9 is particularly useful when incorporated in a camera in which light intensity measurements are made through the camera lens. This is the case when a single lens reflex type of camera is used in which the light incidence upon photocell 3 is cut off during exposure by the operation of the mirror, which must be moved out of the lens-film path during exposure. By utilizing a memory circuit as illustrated in FIG. 9, the proper exposure is memorized just before the shutter mechanism is activated and a correct exposure is obtained.

A field effect transistor is utilized in the embodiment illustrated in FIG. 9 due to the fact that the gate-source resistance of field effect transistors is extremely high. Thus, the value of the resistance in shunt with capacitor 11 is very high making the time constant of the circuit very long. Were a bipolar transistor to be utilized as transistor TR5, the impedance of the base-emitter path would not be as great and the voltage on capacitor 11 would be reduced during the time that it is being read out. Thus, an additional correction would have to be included to compensate for the loss in voltage through the base-emitter path.

The foregoing explanations of the various embodiments of the present invention presupposes that conventional design techniques are also utilized to compensate for particular properties of the various specific components chosen to make the present invention. For example, in FIGS. 2,6,8 and 9, there is also shown a thermister 10 which is utilized to provide a temperature stable circuit. There are, of course, other techniques for achieving temperature stability, all of which may be equally well utilized in constructing an exposure meter in accordance with the present invention. As a further example of ancillary modifications, it is pointed out that various fixed and variable resistors may be utilized in conjunction with photocell 3 and diode 4 to vary the proportion and effect of these elements upon the circuitry connected thereto.

FIG. 10 illustrates another embodiment of the present invention and is in fact a complete schematic of an exposure control circuit built in accordance with the present invention. Elements appearing in FIG. 10 that are common to FIGS. 2,6,8 and 9 bear the same reference numerals as they do in those figures. Specifically, in FIG. 10 a source of voltage 1 is coupled by way of on-off switch 2 to the exposure meter of the present invention. In the exposure meter a photoconductor 3 is series connected with rheostat 13 and diodes 4. Rheostat 13 provides an adjustment of the exponential to linear transformation by diodes 4. As mentioned above, diodes 4 are illustrated as comprising two series connected diodes thereby additively increasing the constant of proportionality $k_4$. This series circuit thus comprises the brightness-to-linear voltage conversion stage of the exposure control system of the present invention. The voltage drop across diodes 4 is coupled by way of switch 14 to memory capacitor 11. Switch 14 illustrates another way in which the memory circuit can be coupled to the source follower stage. In FIG. 9 the memory capacitor was alternately switched between diode 4 and the gate of transistor TR5. In FIG. 10 memory capacitor 11 is continuously connected to the gate of transistor TR5, and coupled by way of a simple switch to diodes 4. This can be done due to the high gate-source impedance of field effect transistor TR5. Switch 14 and memory capacitor 11 thus comprise the memory stage of exposure meter of the present invention.

In the next stage of the exposure control circuit, transistor TR5 and rheostat 15 comprise the voltage follower stage of the exposure meter. Rheostat 15 performs two functions, varying the proportion of the output voltage applied to transistor TR1 and varying the bias on the gate of transistor TR5. The output voltage from transistor TR5 is coupled to the base of transistor TR1 which forms one part of a comparison stage comprising transistors TR1, TR6, and TR7. In this stage fixed resistances 17 and 18 and temperature compensating diode 19 are series connected across voltage source 1 and have a tap thereof connected to the base of transistor TR5. There is thus provided for transistor TR7 a temperature compensated source of fixed voltage. The current flowing through transistor TR7 is therefore constant. Also connected across voltage source 1 is potentiometer 16 having the tap thereof connected to the base of transistor TR6. Storage capacitor 5 and shunting switch 6 are connected to a collector of transistor TR1 in the same manner as in FIGS. 2, 6, 8 and 9. The remainder of the circuitry of FIG. 10 is similar to that of FIGS. 2, 6, 8 and 9 except that the emitter of transistor TR3 is coupled to a potentiometer shunting thermister 10 instead of being directly connected to the emitter of transistor TR4. Further, a damping capacitor 21 has been added in shunt with solenoid 7. The circuitry following the emitter-follower stage is separated from voltage source 1 by switch 20. Switch 20 is closed upon the activation of the shutter mechanism, thus operating oppositely to switch 14 which is opened upon activation of the shutter mechanism. The use of switch 20 in the circuit as shown prevents the drain of a battery during periods of inactivity.

The over-all operation of the exposure control circuitry of FIG. 10 may be best be understood by also considering FIG. 11 in which there is illustrated a composits of the characteristic curves of typical transistors that may be utilized as transistors TR1, TR6, and TR7. When on-off switch 2 is closed, the voltage $V_D$ appearing across diodes 4, in proportion to the logarithm of the brightness, is memorized by memory capacitor 11 while switch 14 is closed. The voltage appearing across capacitor 11 is directly coupled to the gate of field effect transistor TR5. The voltage drop across rheostat 15 connected to the source electrode of transistor TR5 may be represented as follows:

$$V_S = K_6 V_D + V_{SO} \quad (17)$$

where $k_6$ and $V_{SO}$ are constants determined by the resistance of rheostat 15. Rheostat 15 is adjusted so that $k_4 k_6 = k_5$. As noted previously, the base voltage of TR7 is fixed and termperature compensated by the network comprising resistors 17 and 18 and temperature compensating diode 19. A constant collector current passes through transistor TR7 whose value is equal to the sum of the emitter currents from TR1 and TR6. This emitter current is approximately equal to the respective collector currents of the two transistors.

Referring to FIG. 11, transistors TR6 and TR7 have A and B as their operating points on the characteristic curves illustrated in FIG. 11. Transistor TR1 has as its operating points, the points labeled A' and B'.

When the base voltage of transistor TR6 is lowered by an amount $\Delta V_S$ by moving the tap of potentiometer 16, the emitter voltage of transistor TR6 is also lowered by $\Delta V_S$. When this occurs, the collector-emitter voltage of transistor TR7 is also lowered. However, the current flowing through transistor TR7 remains unchanged since the collector saturation resistance of transistor TR7 is large. When this occurs, the base-emitter voltage of the transistor TR1 is increased by $\Delta V_S$ and therefore the collector current of transistor TR1 is increased and the collector current of TR6 is decreased, resulting in no net change in current through transistor TR7. However, as can be seen by inspection of FIG. 11, since the rate of change of the collector current of transistor TR6, is very small, the operating points A and B of transistor TR6 are virtually unchanged. The operating points A' and B' of transistor TR1, however, are changed as a result of the changed position of the tap on potentiometer 16. Thus, it can be seen potentiometer 16 provides a means whereby the current gain of transistor TR1 may be modified.

When the operating region of transistor TR1 is within the region wherein the base emitter voltage $V_{BE}$ and the collector current $i_C$ are in the relation: $V_{BE} \alpha \log i_C$, it is possible to exponentially change the collector current of transistor TR1 by a linear change in the base voltage of transistor TR6. As previously noted, it is also possible to exponentially change the collector voltage by a linear change in the base voltage of transistor TR1. Therefore when the setting of the tap on potentiometer 16 is interlocked with the means for adjusting the diaphragm of a camera lens and a means for setting the film sensitivity, proper exposure time can be automatically determined. There is thus possible a wide range of adjustment even though the change in voltage is linear.

If one desires to know the exposure time of the shutter in advance of taking the picture, one need only measure the potential difference between the bases of transistors TR1 and TR6.

One can eliminate transistor TR6 and TR7 by directoly connecting the tap of potentiometer 16 to the emitter of transistor TR1.

As with the preceding embodiments, the charging of capacitor 5 takes place in a linear manner thereby enabling an accurate control of the exposure time. Also by adjustment of rheostats 13 and 15 and by appropriately selecting the paramenters of the photoconducting element 3 it is possible to convert $\gamma$ of the photoconductor to any desired value, for example 1. Even if the parameters are of photoconductor 3 are irregular over a portion of the operating range, correction can be maintained by adjustment of the rheostats.

A wide range of brightnesses can be memorized by virtue of the fact that diodes 4 convert the exponential variations in current due to brightness into linear variations in voltage which are then readily memorized by capacitor 11.

While a preferred embodiment of the present invention has been shown and described, it will be apparent to those of ordinary skill in the art that many modifications may be made within the spirit and scope of the present invention.

What I claim as new and desire to secure by Letters patent of the United States is:

1. In a camera having an objective lens and a shutter moveable between closed and open positions, an exposure control arrangement comprising:

light intensity to electrical signal conversion means positioned behind said objective lens for converting essentially each value of the intensity of the light passing through said objective lens during use of said camera to an electrical signal having a value essentially linearly proportional to a logarithm of the value of said intensity;

memory means for storing said electrical signal;

switch means for coupling said memory means to said conversion means during intervals when the light passing through said objective lens is incident on said conversion means and for disconnecting said memory means from said conversion means when light passing through said objective lens is not incident on said conversion means;

second conversion means coupled to said memory means for converting the value of the first electrical signal stored in said memory means to a second electrical signal having a value proportional to an antilogarithm of said first electrical signal; and shutter actuating circuit means coupled to said second conversion means for returning said shutter to said closed position in accordance with said second electrical signal.

2. In a camera having an objective lens and a shutter moveable between closed and open positions, an exposure control arrangement comprising:

light intensity to voltage conversion means positioned behind said objective lens for converting essentially each value of the intensity of light passing through said objective lens during use of said camera to a voltage having a value essentially linearly proportional to a logarithm of the value of said intensity;

capacitor memory means for storing said voltage;

switching means for coupling said capacitor memory means to said light conversion means during intervals when the light passing through said objective lens is incident on said light conversion means and for disconnecting said memory means from said light conversion means when the light passing through said objective lens is not incident on said light conversion means;

timing circuit means including voltage to current conversion means coupled to said capacitor memory means for converting at least a portion of the value of said voltage stored in said capacitor memory means to a current having a value proportional to an antilogarithm of said voltage, and a timing capacitor charged by said current; and shutter actuating circuit means coupled to said timing circuit means for returning said shutter to said closed position when said timing capacitor is charged to a predetermined voltage.

3. An exposure control arrangement as set forth in claim 2 wherein said capacitor memory means is connected to the input of said timing circuit means and wherein said switching means is connected between the output of said light intensity to voltage conversion means and the junction of said capacitor memory means and the input of said timing circuit means.

4. An exposure control circuit as set forth in claim 2 wherein said timing circuit means includes:

a transistor having emitter, base, and collector electrodes, and wherein said timing capacitor is series connected with the emitter-collector path of said transistor; the base of said transistor being coupled to receive at least a portion of the voltage stored in said capacitor memory means and said transistor acting as a constant current source for charging said capacitor to a predetermined voltage.

5. An exposure control circuit as set forth in claim 4, wherein said timing circuit means further comprises:

switch means connected in shunt with said timing capacitor for controlling the charging of said timing capacitor.

6. An exposure control circuit as set forth in claim 4 wherein said light intensity to voltage conversion means comprises:

photoconductor cell means, and diode means series connected to said photoconductor cell means, the junction of said diode means and said photoconductor cell means being coupled to said base electrode.

7. An exposure control circuit as set forth in claim 6 wherein said diode means comprises a plurality of series connected diodes.

8. In a camera having an objective lens and a shutter moveable between closed and open positions, an exposure control arrangement comprising:

light intensity to voltage conversion means positioned behind said objective lens for converting essentially each value of the intensity of light passing through said objective lens during the use of said camera to a voltage having a value essentially linearly proportional to a logarithm of the value of said intensity;

capacitor memory means for storing said voltage;

amplifier circuit means coupled to said capacitor memory means for amplifying said voltage to a second voltage;

switching means for coupling said capacitor memory means to said light conversion means during intervals when the light passing through said objective lens is incident on said light conversion means and for disconnecting said capacitor memory means from said light conversion means when light passing through said objective lens is not incident on said light conversion means;

timing circuit means including voltage to time conversion means coupled to said amplifier circuit means for converting the value of at least a portion of said second voltage to a current having a value proportional to an antilogarithm of said second voltage, and a timing capacitor charged by said current; and shutter actuating circuit means coupled to said timing circuit means for returning said shutter to said closed position when said timing capacitor is charged to a predetermined voltage;

said amplifier circuit means having an amplifying factor established to maintain the product of said time lapse interval and the value of the intensity of said light passing through said objective lens substantially constant.

9. An exposure control circuit as set forth in claim 8 wherein said timing circuit means includes:

a first transistor having emitter, base and collector electrodes, and wherein said timing capacitor is series connected with the emitter-collector path of said first transistor; the base of said first transistor being coupled to said voltage follower means and said first transistor acting as a constant current source for charging said timing capacitor to said predetermined voltage.

10. An exposure control circuit as set forth in claim 9 wherein said timing circuit means further comprises:

second and third transistors each having emitter, base, and collector electrodes, and a source of variable reference voltage;

a source of fixed reference voltage;

the collector of said second transistor being connectable to a source of operating voltage, the base of said second transistor being coupled to said source of variable reference voltage, the emitters of said first and second transistors being connected together and connected to the collector of said third transistor so that the collector-emitter current paths of said first and second transistors are series connected with collector-emitter current path of said third transistor, and the base of said third transistor being coupled to said source of fixed reference voltage so that said third transistor operates in a constant current mode.

11. An exposure control circuit as set forth in claim 10 wherein said source of variable operating potential comprises a potentiometer connectable to a source of operating voltage and having the tap thereof connected to the base of said second transistor.

12. An exposure control circuit as set forth in claim 10 wherein said source of fixed reference potential comprises:

a series circuit connectable to a source of operating voltage comprising a fixed resistor and a temperature compensating diode connected therebetween; the base of said third transistor being connected to the junction of said temperature compensating diode and said fixed resistor.

13. An exposure control circuit as set forth in claim 12 wherein said source of variable operating potential comprises a potentiometer connectable to a source of operating voltage and having the tap thereof connected to the base of said second transistor.

14. In a camera having an objective lens and a shutter moveable between closed and open positions, an exposure control arrangement comprising:

light intensity to voltage conversion means positioned behind said objective lens for converting essentially each value of the intensity of the light passing through said objective lens during use of said camera to a first voltage having a value essentially linearly proportional to a logarithm of the value of said intensity;

capacitor memory means for storing said first voltage;

switching means for coupling said capacitor memory means to said light conversion means during intervals when the light passing through said objective lens is incident on said light conversion means and for disconnecting said memory means from said light conversion means when the light passing through said objective lens is not incident on said light conversion means;

circuit means for generating a second voltage having a value proportional to a logarithm of the value of film sensitivity and aperture opening of said camera objective;

timing circuit means including voltage to current conversion means coupled to said capacitor memory means and to said circuit means for converting said first and second voltage to a current having a value proportional to an antilogarithm of the difference between said first and second voltage and a timing capacitor charged by said current; and shutter actuating circuit means coupled to said timing means for returning said shutter to said closed position when said timing capacitor is charged to a predetermined voltage.

15. An exposure control arrangement as set forth in claim 14 wherein said voltage to current conversion means includes a transistor differential amplifier having a first and a second input terminal and an output terminal, said first input terminal being coupled to said capacitor memory means, said second input terminal being coupled to said circuit means and said output terminal being coupled to said timing capacitor.

16. An exposure control arrangement as set forth in claim 15 wherein said timing circuit means further comprises an amplifying stage coupling said capacitor memory means to said first input terminal of said differential amplifier, said amplifying stage being in the configuration of a source follower.

* * * * *